United States Patent [19]

Mori

[11] Patent Number: 4,497,245
[45] Date of Patent: * Feb. 5, 1985

[54] PINEAPPLE CUTTER

[75] Inventor: Kashichi Mori, Iwatsuki, Japan

[73] Assignee: Kowa Shoji Kabushiki Kaisha, Tokyo, Japan

[*] Notice: The portion of the term of this patent subsequent to Apr. 10, 2001 has been disclaimed.

[21] Appl. No.: 513,594

[22] Filed: Jul. 14, 1983

[30] Foreign Application Priority Data

May 26, 1983 [JP] Japan .............................. 58-78150[U]

[51] Int. Cl.³ .......................... A23N 4/00; A23N 4/20; A23N 7/08
[52] U.S. Cl. ....................................... 99/542; 99/544; 99/547; 99/593
[58] Field of Search ................. 99/539, 505, 541, 515, 99/542, 547, 543-545, 584, 588, 593, 644; 30/300, 301, 113.1-113.3, 130, 117; 83/651.1; 408/199, 200

[56] References Cited

U.S. PATENT DOCUMENTS 3,874,280 4/1975 Vadas ..................... 99/544

FOREIGN PATENT DOCUMENTS 76892 2/1918 Switzerland ........................... 99/545
764717 1/1957 United Kingdom .................. 99/545

Primary Examiner—Timothy F. Simone
Attorney, Agent, or Firm—Blum, Kaplan, Friedman, Silberman & Beran

[57] ABSTRACT

A pineapple cutter, wherein a smaller diameter tubular cutter for cutting the core of a pineapple and a larger diameter tubular cutter for cutting the peel of the pineapple are concentrically arranged on upper peripheral edge of a cylindrical body having a base disc, between said cutters a pineapple loading table is inserted loosely in vertically movable state, a horizontal rod for vertical movement of said loading table is connected with a vertically operating rod passing through a slant groove which is provided obiquely in vertical direction in the peripheral said wall of said cylindrical body.

The larger diameter tubular cutter is tightly inserted in a cylindrical guide body for guiding vertical movement of said cutter, and the guide body and an annular frame body having a circular window of fairly larger inside diameter than outside diameter of the largest pineapple, are made into one body through fitting frames to form an equipping frame body, the annular frame body being detachably fitted to upper wall of the frame at a concentric position with said cylindrical body, and the engagement between the larger diameter tubular cutter and the cylindrical body is integrated only when they rotate in peripheral direction, and due to their detachable engagement in vertical direction, when the equipping frame body is detached from the upper wall of the frame in the upward direction, the larger diameter tubular cutter will also detach upwardly from said cylindrical body by the frictional engagement with the cylindrical guide body.

7 Claims, 6 Drawing Figures

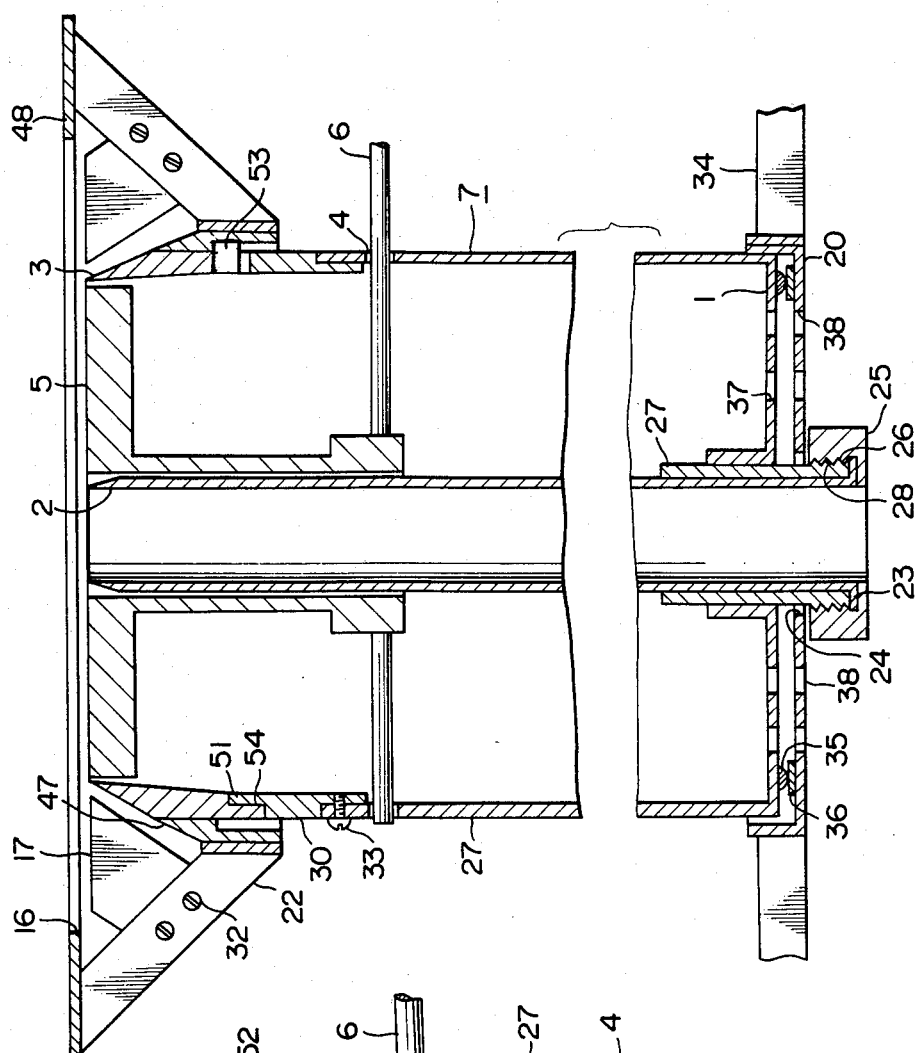
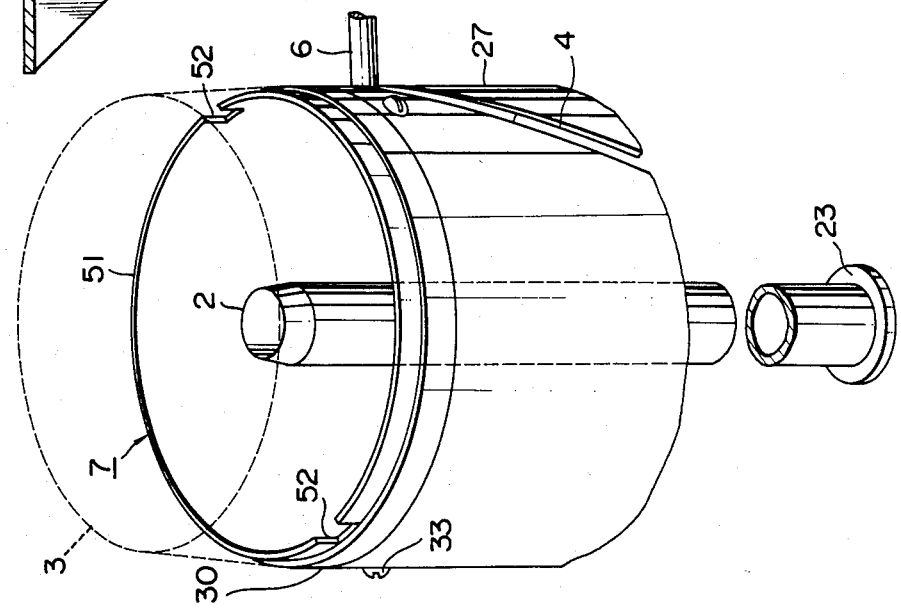

PINEAPPLE CUTTER

BACKGROUND OF THE INVENTION

Up to the present, the pineapple cutter by means of manual operation has been contrived in various ways, however, any of them could not get rid of poor utility.

I have invented the pineapple cutter as disclosed in U.S. Patent Application Ser. No. 385,952, which corresponds to Japanese Utility Model Application No. 115,130/81, namely Japanese Utility Model Laid-Open Publicaton No. 21,291/83 dated Feb. 9, 1983.

SUMMARY OF THE INVENTION

This invention is an improvement of my invention as above.

A object of this invention is to provide a pineapple cutter, in which above mentioned defect is eliminated, enabling to remove at the same time hard peel and core of a pineapple easily and accurately even at the shopfront of a fruit store.

A further object of this invention is to provide a pineapple cutter, in which an exchange of cutters can be operated simply and easily.

BRIEF DESCRIPTION OF THE DRAWINGS

The drawings show an embodiment of a pineapple cutter according to this invention, in which:

FIG. 2 is a partially cutaway perspective view of the main part of the cutter shown in FIG. 1, including a tubular cutter for peeling of a pineapple, a cylindrical body and a smaller diameter tubular cutter.

FIG. 3 is a partially cutaway sectional side view of FIG. 2.

DESCRIPTION OF THE PREFERRED EMBODIMENTS

An embodiment of this invention will be described in detail about the accompanying drawings as follows.

Figures 1, 6:
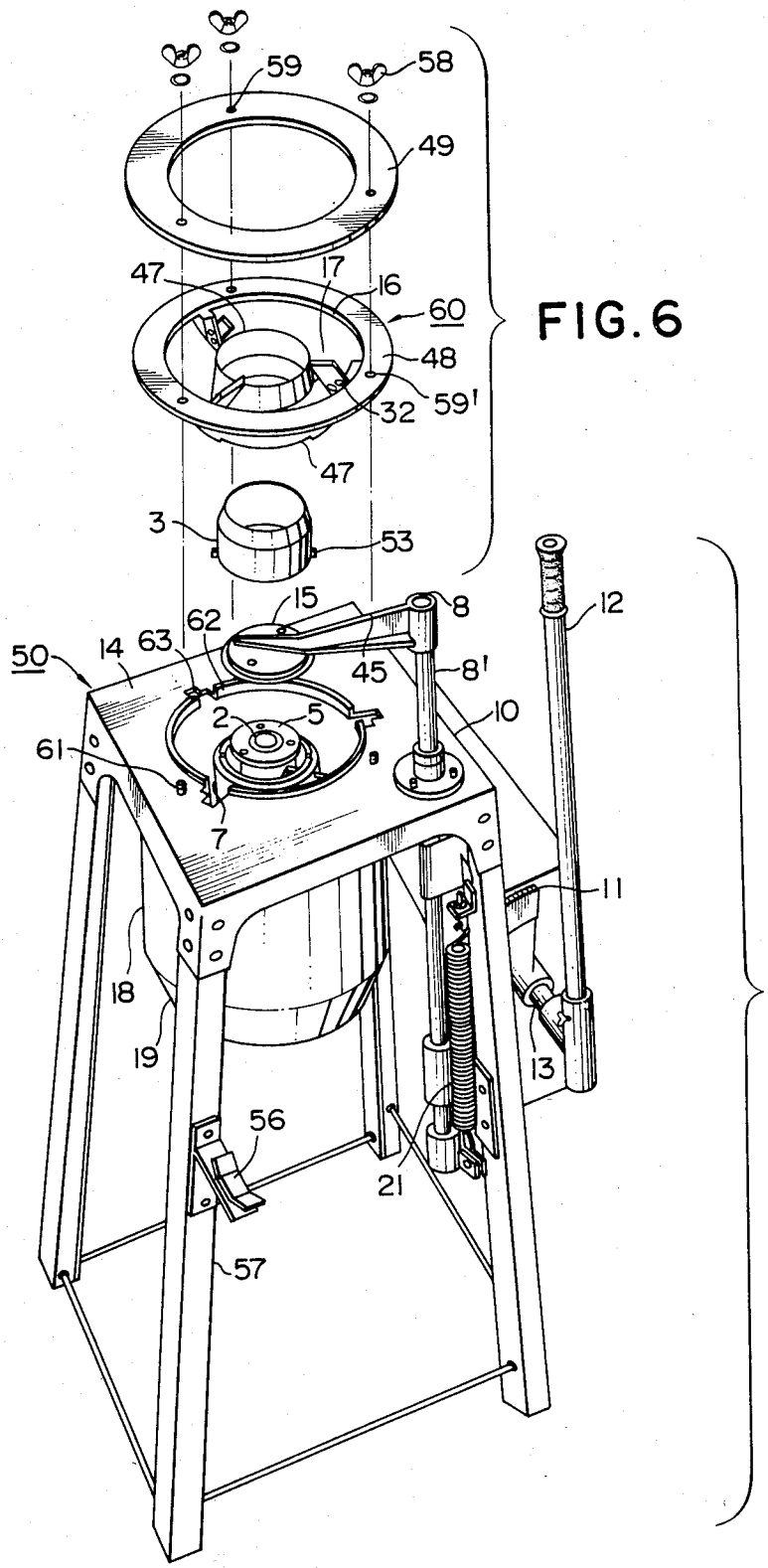
FIG. 1 is a whole external perspective view with the exception of the equipping frame body.
FIG. 6 is a perspective view of the equipping frame body and the tubular cutter.

As shown in FIG. 2 and FIG. 3, on upper peripheral edge portion (51) of a cylindrical body (7) having a base disc (1) on which a tubular cutter (2), for cutting the core of a pineapple, having smaller diameter and larger height than standard length of pineapple is erected, a larger Diameter tubular cutter (3) for peeling of a pineapple is detachably engaged concentrically with the tubular cutter (2) so as to become nearly same height as the tubular cutter (2). Namely, as shown in FIG. 2, plural engaging notches (52), (52) are cut on the upper peripheral edge portion (51) of the cylindrical body (7), and corresponding with said notches, engaging projections (53), (53) are provided on lower end of the larger diameter tubular cutter (3) as shown in FIG. 6, and a peripheral groove (54) for engagement is cut on lower portion of the tubular cutter (3) so that the upper peripheral edge portion (51) fits within the peripheral groove (54), and so, the tubular cutter (3) and the cylindrical body (7) become integrated only at the time of rotation in peripheral direction, but detachably engage in vertical direction. And between the two tubular cutters of larger diameter (3) and of smaller diameter (2), a loading table (5) for pineapple is vertically movably and loosely inserted, and a horizontal rod (6) for vertical movement of the loading table (5) is connected to a vertically operating rod (8) passing through a slant groove (4) which is provided obliquely in vertical direction in a side peripheral wall (27) of the cylindrical body (7), and the base disc (1) of the cylindrical body (7) is rotatably mounted on a base disc supporter (20) fitted to a frame (10) of the pineapple cutter (50) so that the cylindrical body (7), the larger diameter tubular cutter (3) and the smaller diameter tubular cutter (2) are rotated accompanied with vertical movement of said vertically operating rod (8), which is provided with a rack (9) in vertical direction and mounted on the frame (10) so as to rotate a gear (11) meshing with said rack by means of a turning lever (12), and further, as shown in FIG. 1, a pressing disc (15) for pineapple is projectingly provided on an upwardly projected portion (8') passing through an upper wall (14) of the frame, with an interval corresponding to the standard length of a pineapple at a position above said loading table (5) for pineapple. Gear (11) is provided with a shaft (13).

In FIG. 1, (56) is a stopper projectingly provided on a leg portion (57) of the frame (10) to limit the amount downward rotation of the turning lever (12).

In FIG. 6, (48) is an annular frame body having a circular window (16) with larger inside diameter than the outside diameter of the largest thickness of a pineapple, and said annular frame body (48) is detachably equipped on the upper wall (14) of the frame (10) by means of butterfly nuts (58), (58). (47) is a tubular guide body made of vinyl chloride to tightly insert said larger diameter tubular cutter (3) and to guide its vertical movement, and said tubular guide body (47) is secured to said annular frame body (48) through fitting rods (22), (22), thus forming an integral equipping frame body (60).

In said equipping frame body (60), a plurality of peeling cutters (17), (17), (17) are detachably and radially fitted by means of screws (32), (32), (32) to fitting rods (22), (22), (22) from the frame body (48), at a position a little lower than said circular window (16) and outside of said larger diameter tubular cutter (3). Thereby, the peel cut by means of this cutter (3) will be divided into a plurality of pieces and dropped downward. For preventing thus dropped peel from outward scattering, a cylindrical cover (18) is fitted to the frame (10). (19) is a lower opening of the cylindrical cover (18) and a peel receiving bag (not shown) or a peel receiving bucket will be placed below said opening (19). (49) is a press down plate for fixing said equipping frame body (60) on the upper wall (14) of the frame (10). (61), (61) are bolts for fitting the equipping frame body (60) projectingly provided on the upper wall (14) of the frame (10), and inserting holes (59), (59), (59'), (59') are respectively bored in the annular press down plate (19) and the annular frame body (48) to insert said bolts (61), (61), on which butterfly nuts (58), (58) are screwed from above. As shown in FIG. 1, on the upper wall (14) of the frame (10), a circular window (62) is bored to receive said equipping frame body (60), and in connection with said circular window (62), notches (63), (63) are bored to insert the fitting frames (22), (22). (21) is a coil spring spanned in the vertical direction, which is fitted between the lower end of the vertically operating rod (8) and the upper wall (14) of the frame (10). serving to assist the force of user when the loading table (5) for pineapple is raised, after the peel and the core of a pineapple is cut off.

As shown in FIG. 3, the lower end portion (23) of said smaller diameter tubular cutter (2) passes through the central hole (24) of said base disc supporter (20), below which a fitting block (25) having inner thread (28) and a fixed tube (27) having outer thread (26) are screwed together, with larger outside diameter than inside diameter of said central hole (24). On the upper inner periphery of said fitting block (25), the thread (28) is cut to mesh with the thread (26) of the fixed tube (27) which is welded at the central portion of the base disc (1), thereby said smaller diameter tubular cutter (2) is detachably fitted to the base disc (1) and said cylindrical body (7) will not be detached from the base disc supporter (20).

As shown in FIG. 3, an annular projection (35) is provided near the peripheral edge of base disc (1) of the cylindrical body (7) and corresponding thereto an annular receiving seat (36) made of vinyl and the like is mounted on the base disc supporter (20). (34) is a supporting rod for fitting the base disc supporter (20) to the frame (10). (37), (38) are drain holes respectively bored in the base disc (1) and the base disc supporter (20). (30) is an annular body for receiving the larger diameter tubular cutter (3), and said annular body (30) is forming the upper edge portion of the cylindrical body (7), where said engaging notches (52) are existing. (33) are fitting screws for said body.

Figure 4:
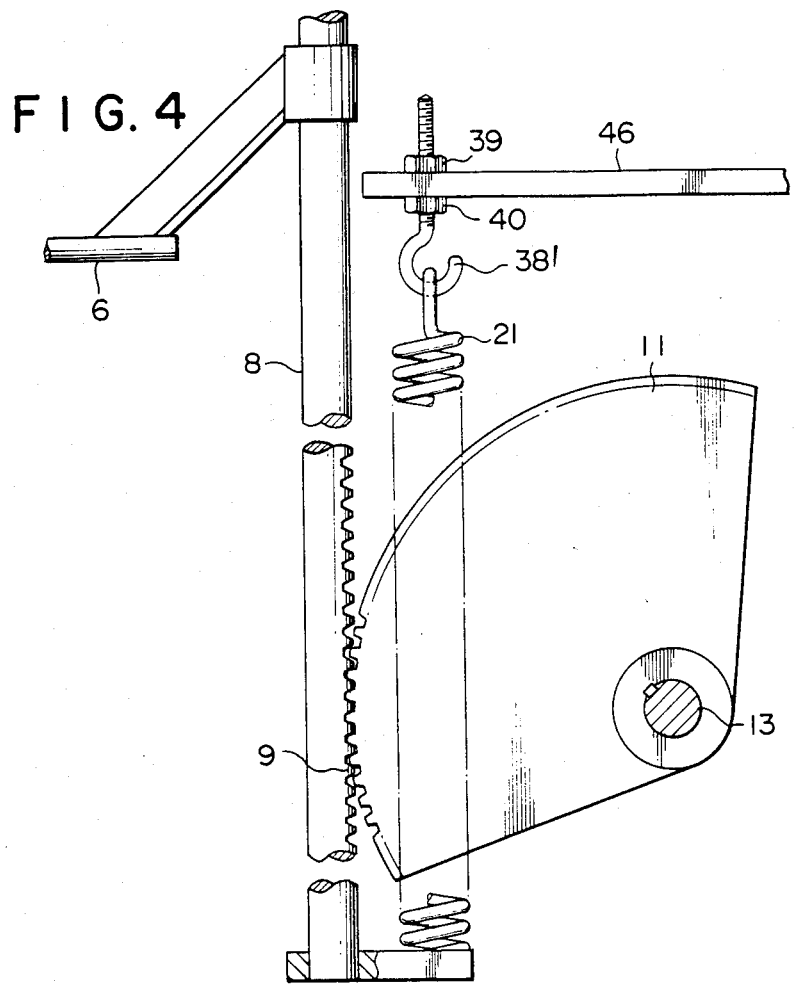
FIG. 4 is a partially cutaway side view, including a vertically operating rod and the like shown in FIG. 1.

As shown in FIG. 4, the upper portion of said coil spring (21) is fitted to a fitting platform (46) from the frame (10) through a hanging hook (38') with threaded rod, and respectively clamped by nuts (39), (40) on upper face and lower face of said fitting platform (46), thereby the tension of the coil spring (21) can be adjusted for the convenience of users.

Figure 5:
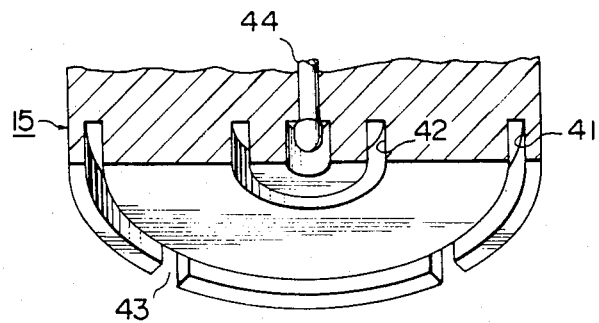
FIG. 5 is a partially cutaway perspective view of a pressing disc for pineapple shown in FIG. 1.

As shown in FIG. 5, in the under face of the pressing disc (15) for pineapple, two of larger and smaller circular grooves (41), (42), which are enough to receive said larger diameter tubular cutter (3) and said smaller diameter tubular cutter (2), are bored, as well as grooves (43), (43), (43), which are enough to receive said peeling cutters (17), (17), (17), are notched. (44) is a set-screw for fitting the pressing disc (15) to an arm rod (45) from the vertically operating rod (8).

This invention is composed as above mentioned manner, wherein a pineapple of which upper and lower end portions are cut off into required size is loaded on the loading table (5), then the turning lever (12) is turned to lower said loading table (5) and to push the pineapple downward by means of the pressing disc (15), thereby hard peel and core of the pineapple are cut off respectively by the larger diameter tubular cutter (2), thus forming the pineapple into predetermined shapes to be eaten easily.

The device according to this invention is characterized in various points that it is easy to use and even with weak human power sufficient forming of pineapple is possible, cleaning after its use is sufficiently effected merely with water pouring inside and outside of the device by means of a hose, handling of the device is simple, and the like.

Particularly, in this invention, the larger diameter tubular cutter (3) is tightly inserted in the cylindrical guide body (47) for guiding vertical movement of the cutter (3), and the guide body (47) and the annular frame body (48) having the circular window (16) of fairly larger inside diameter than outside diameter of the largest pineapple, are made into one body through the fitting frames (22), (22) to form the equipping frame body (60), the annular frame body (48) being detachably fitted to the upper wall (44) of the frame (10) at a concentric position with said cylindrical body (7), and the engagement between the larger diameter tubular cutter (3) and the cylindrical body (7) is integrated only when they rotate in peripheral direction, and due to their detachable engagement in vertical direction, when the equipping frame body (60) is detached from the upper wall (14) of the frame (10) in the upward direction, the larger diameter tubular cutter (3) will also detach upwardly from the cylindrical body (7), and based on the above mentioned formation, larger advantage will be obtained that upon the exchange of the larger diameter tubular cutter (3) and the peeling cutters (17), (17), (17), the exchange thereof will be simply operated only by detaching the equipping frame body (60) from the frame (10) in upward direction, thus offering much convenience to the user.

What is claimed is:

1. A pineapple cutter comprising:

a pineapple cutter frame having an upper wall;

a cylindrical body rotatably mounted on said cutter frame and having a side peripheral wall and a base disc, said peripheral wall being formed with a slant groove which is provided obliquely in a vertical direction in said peripheral wall;

a smaller-diameter tubular cutter mounted on said base disc for cutting the core of a pineapple;

a larger-diameter tubular cutter situated concentrically around said smaller-diameter tubular cutter for peeling a pineapple, said larger-diameter tubular cutter being engaged with said cylindrical body so that said larger-diameter tubular cutter rotates with said body, is positioned at about the same height as said smaller-diameter tubular cutter, and is detachable from said cylindrical body by upward displacement of said larger-diameter tubular cutter;

a loading table being vertically movable and loosely inserted between said larger-diameter tubular cutter and said smaller-diameter tubular cutter for receiving a pineapple;

a horizontal rod connected to said loading table and passing through said slant groove, said horizontal rod being used to provide a vertical movement to said loading table and rotational movement to said cylindrical body, larger-diameter tubular cutter and smaller-diameter tubular cutter; and an equipping frame body removably mounted on the upper wall of said cutter frame at a concentric position with said cylindrical body and including a cylindrical guide body dimensioned for frictional engagement with said larger-diameter tubular cutter, an annular frame body for engaging said upper wall of said cutter frame and having a circular window having an inside diameter larger than the outside diameter of the largest pineapple to be cut, and a plurality of fitting frames joining said guide body and said annular frame body, said equipping frame body being coupled to the upper wall of said pineapple cutter frame to prevent relative rotational movement therebetween, whereby when said equipping frame body is detached from the upper wall of said pineapple cutter frame in the upward direction, said larger-diameter tubular cutter will also detach upwardly from said cylindrical body by the frictional engagement with said cylindrical guide body.

2. A pineapple cutter as claimed in claim 1, further including a plurality of peeling cutters, said peeling cutters being radially fitted to the plurality of fitting frames which connect said cylindrical guide body with said frame body at a position slightly lower than said circular window and outside of said larger-diameter tubular cutter.

3. A pineapple cutter as claimed in claim 1, wherein said upper wall of said cutter frame is formed with a circular window for receiving said equipping frame body and notches in the periphery of said upper wall circular window, said fitting frames engaging in said notches for preventing relative rotation of said cutter frame and said equipping frame body.

4. A pineapple cutter as claimed in claim 3, including a plurality of bolt means for releasably securing said equipping frame body to said cutting frame, said bolts being positioned in a vertical direction at a point slightly outside of the circular window of said cutter frame, said annular frame body being formed with a plurality of holes for receipt of said bolt means.

5. A pineapple cutter as claimed in claim 1, further including means for vertically displacing said horizontal rod, said displacing means including a vertically displaceable rod mounted on said cutter frame.

6. A pineapple cutter as claimed in claim 5, further including a rack and gear assembly, a turning lever connected to said rack and gear for vertically displacing said rod, and a stopper for limiting the lower range of said turning lever, said stopper being provided on said cutter frame.

7. A pineapple cutter as claimed in claim 1, further including a base disc supporter fitted to said cutter frame for rotatably supporting said cylindrical body.

* * * * *